United States Patent
Flaherty (10) Patent No.: US 8,304,996 B2
(45) Date of Patent: *Nov. 6, 2012

(54) PHOTOSENSOR CIRCUITS INCLUDING A CURRENT AMPLIFIER

(75) Inventor: Richard Charles Flaherty, Fuquay Varina, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 358 days.

This patent is subject to a terminal disclaimer.

(21) Appl. No.: 12/700,251

(22) Filed: Feb. 4, 2010

(65) Prior Publication Data

US 2011/0187272 A1 Aug. 4, 2011

(51) Int. Cl.
*H05B 37/02* (2006.01)
(52) U.S. Cl. ............... 315/149; 315/158; 315/291
(58) Field of Classification Search .......... 315/149–159, 315/291, 307, 308; 250/214 R, 214 SW, 250/205; 363/16, 19; 307/117
See application file for complete search history.

(56) References Cited

U.S. PATENT DOCUMENTS

| | | | |
|---|---|---|---|
| 4,300,090 A | | 11/1981 | Weber |
| 4,342,906 A | * | 8/1982 | Hyatt ............... 250/205 |
| 4,870,327 A | * | 9/1989 | Jorgensen ............ 315/307 |
| 5,751,118 A | * | 5/1998 | Mortimer ............ 315/291 |
| 6,903,942 B2 | | 6/2005 | Flaherty ............... 363/16 |
| 7,352,138 B2 | * | 4/2008 | Lys et al. ............ 315/291 |
| 7,804,200 B2 | * | 9/2010 | Flaherty ............ 307/117 |
| 8,026,470 B2 | * | 9/2011 | Flaherty ............ 250/214 R |
| 2002/0113555 A1 | * | 8/2002 | Lys et al. ............ 315/149 |
| 2004/0155638 A1 | | 8/2004 | Flaherty |
| 2009/0261660 A1 | | 10/2009 | Flaherty ............ 307/117 |
| 2010/0283328 A1 | | 11/2010 | Eggert |

FOREIGN PATENT DOCUMENTS

DE 10 2007 060 201 A1 6/2009

OTHER PUBLICATIONS

U.S. Appl. No. 12/255,881, filed Oct. 22, 2008.
International Search Report and Written Opinion of the International Searching Authority for International Application No. PCT/US2011/023293; Date of Mailing: Apr. 15, 2011; 11 pp.

* cited by examiner

*Primary Examiner* — Tung X Le
(74) *Attorney, Agent, or Firm* — Myers Bigel Sibley & Sajovec (57) ABSTRACT

Photosensor circuits include a relay coil configured to control application of an alternating current (AC) power source to a load. The circuit includes a pulse width modulator circuit configured to generate a pulse width modulated signal having a pulse width that varies responsive to an average voltage across the relay coil, including a capacitor of an averaging circuit coupled in parallel with the relay coil. A drive transistor is coupled between the relay coil and a neutral bus that controls the average voltage across the relay coil responsive to the pulse width modulated signal. A photo control circuit, including a select transistor, is configured to control application of the pulse width modulated signal to the drive transistor responsive to a detected light level. The pulse width modulator circuit further includes a current amplifier coupled between the voltage averaging circuit and the select transistor. The current amplifier may amplify a current discharged from the capacitor of the voltage averaging circuit to a base of the drive transistor during the negative half of the AC power source to reduce an amount of current discharged from the capacitor of the voltage circuit .during the negative half of the AC power source.

17 Claims, 7 Drawing Sheets

FIG. 7

PHOTOSENSOR CIRCUITS INCLUDING A CURRENT AMPLIFIER

BACKGROUND OF THE INVENTION

The present invention relates to photosensor circuits and, more particularly, photosensor circuits for light level switching control.

Photo controllers are devices that automatically turn electrical devices on and off in response to the ambient light level. They are used, for example, on street lights to automatically turn them off during the day and on at night. They are also used on billboard lighting systems to turn the billboard lights on early at night, off late at night during periods of low vehicular traffic, on again during early morning rush hour periods when high traffic levels resume, and then off during the daylight hours. Photo controllers may also be used in reverse, for example, to turn a golf course water fountain on during the day and off at night.

A variety of devices, including photo controllers, may make use of power converters to convert relatively high voltage alternating current to relatively low voltage direct current as is used in many conventional electronic devices. Some conventional power converters make use of large, high-voltage resistors to drop the voltage. However, these resistors are typically inefficient and generate high heat. The heat generated from the resistors may require that the resistors be housed in a large package and include heat dissipating elements, such as heat sinks. Also, the high heat generated by the resistors can lead to problems with reliability and longevity in the resistors and in other electronic components situated near the resistors.

Another conventional approach to power conversion is the use of a switch mode power converter. The switch mode power converters typically require six transistors or a micro-controller to implement. The requirement for multiple transistors or a micro-controller may cause the implementation of switch mode power converters to be cost prohibitive in some applications, such as in photo controllers.

Figure 1:
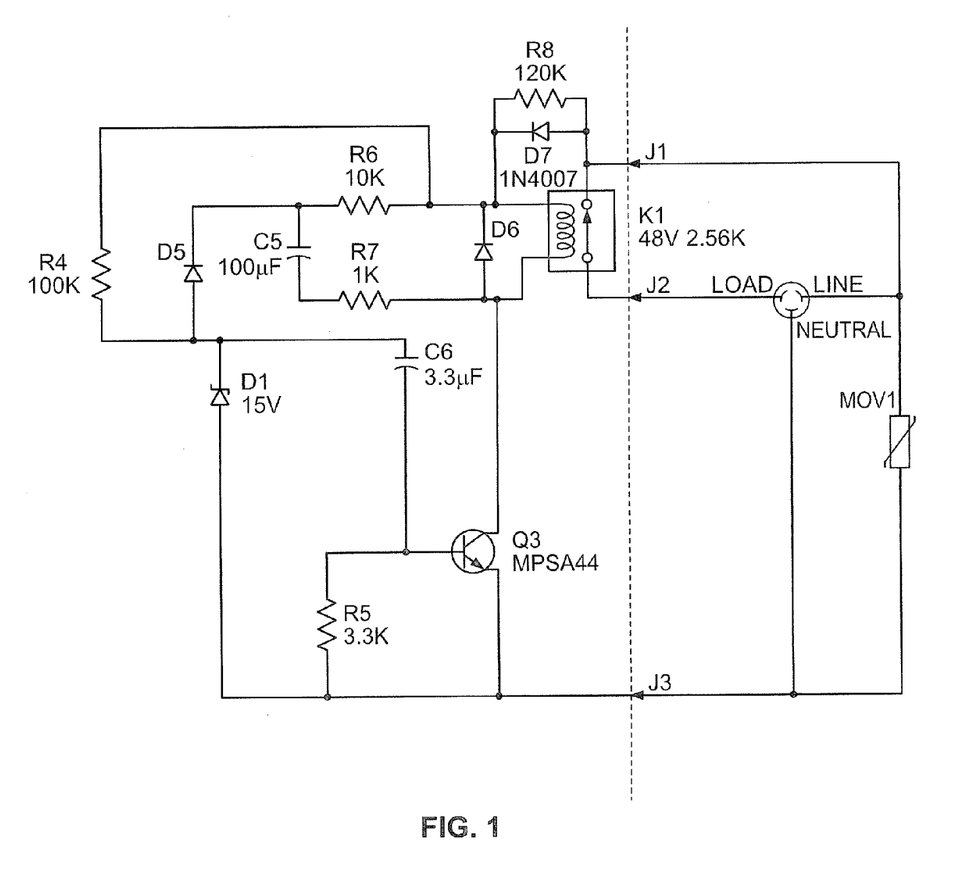
FIG. 1 is a circuit diagram of a power regulator according to the prior art.

A small, low cost, efficient switch mode power converter is described in U.S. Pat. No. 6,903,942 ("the '942 patent"), which is hereby incorporated herein by reference as if set forth in its entirety. The switch mode power converter of the '942 patent is illustrated in FIG. 1. The circuit shown in FIG. 1 is a switch mode power regulator, which implements power line synchronized pulse width modulation (firing angle modulation). The circuit comprises a power circuit and a control circuit. The power circuit comprises an output stage, which comprises a transistor Q3. The transistor's collector circuit comprises a relay K1 and a diode D6, known as a snubber diode, in parallel with the relay K1.

The circuit further comprises a first capacitor C6 coupled to the base of the transistor Q3, a first resistor R4 coupled in series to the first capacitor C6, and a second resistor R8 coupled in series to the first resistor R4. The circuit shown further comprises a first diode D7 coupled in parallel with the second resistor R8. The circuit further comprises a third resistor R5 coupled to the base of the first transistor Q3 and a Zener diode D1, whose cathode is connected to the first capacitor C6 and a second diode D5, and whose anode is connected to the third resistor R5.

The circuit also comprises a fourth resistor R6 coupled in series with the third diode D5, a relay K1 coupled in series with the fourth resistor R6, a third diode D6 coupled in parallel with the relay K1, a second capacitor C5 coupled to the fourth resistor R6, a fifth resistor R7 coupled in series with the second capacitor C5; and a plug, comprising a load, a neutral, and a line, wherein the load is coupled to the relay K1, the neutral is coupled to the emitter of the transistor Q3, and the line is coupled to the variable resistor, MOV1.

Transistor Q3 regulates the average voltage across the relay coil K1 by means of pulse width modulation. In the embodiment shown, transistor Q3 comprises a bipolar transistor, however, transistor Q3 may instead be a field-effect transistor (FET), or an insulated gate bipolar transistor (IGBT), provided a diode is placed cathode to drain and anode to source.

Transistor Q3 starts conducting at the start of the power line cycle (0 degrees) and continues conducting until enough current has flowed to maintain the relay voltage at the desired level. When transistor Q3 turns off, a voltage will be induced across the relay coil K1 by magnetic induction. This voltage is partially suppressed by diode D6 in order to prevent the failure of transistor Q3 due to over voltage.

The circuit shown in FIG. 1 utilizes half-wave rectification. Half-wave rectification is less expensive that full-wave rectification and requires less components. Since the relay K1 is highly inductive, it does not require a particularly clean DC signal. For example, the DC signal may include a large amount of ripple, which will not affect the operation of relay K1. Half wave rectification allows the circuit to operate in two modes, positive and negative. During the positive half, the transistor Q3 generates a current pulse, which is regulated by the average voltage across the relay K1. This process is pulse width modulation.

The control circuit shown in FIG. 1 comprises a pulse generator whose pulse width varies proportionately with the difference between the Zener voltage of diode D1 and the average voltage across the relay K1. At the start of the power line cycle (0 degrees), a current will begin to flow through diode D7, resistor R4, capacitor C6, and the base of transistor Q3. The current will cause transistor Q3 to turn on, starting a pulse.

Diode D7 and Resistor R8 provide half-wave power rectification. Resistor R8 is applied across the power rectifier D7, applying a negative current during the negative half of the line cycle. Resistor R8 allows a small negative current to be applied. Resistor R8 provides the negative current that switches on transistor Q3 during the negative half of the line cycle. That negative charge conducted through R8 must exceed the charge that conducts through capacitor C6 to assure transistor Q3 will turn on. Negative current switches on rectifier D6 and turns on transistor Q3, providing a current path between the low voltage side of capacitor C5 through resistor R7.

In the embodiment shown, without resistor R7, transistor Q3 would not saturate during the current pulse, causing excessive power to be dissipated in transistor Q3. The transistor Q3 collector voltage would drop until diode D5 would conduct, diverting base current from transistor Q3 and preventing transistor Q3 from saturating. During the transistor Q3 current pulse, a voltage is generated across resistor R7 that will keep diode D5 from conducting and preventing transistor Q3 saturation. To prevent diode D5 from conducting during the positive half of the line cycle, a voltage of at least the capacitor C6 ripple voltage must drop across resistor R7. Transistor Q3 does not start conducting until the instantaneous line voltage is approximately twice the Zener voltage of diode D1.

Capacitor C5 filters the voltage across the relay K1. If the value of C5 is too small, the relay coil current will oscillate on and off during power up causing the relay contacts to chatter. Therefore, capacitor C5 shown is large enough a value to prevent this chattering of the relay contacts.

Capacitor C6 is pre-set to the output voltage and provides a timing functionality. During the positive half of the line cycle, a current flows through resistor R4 to capacitor C6, causing it to start charging, and through the base of transistor Q3, which will turn Q3 on. Transistor Q3 remains on as long a current flows through capacitor C6. Increasing the value of capacitor C6 has the positive effect of increasing the gain of the feed back loop of the regulator circuit. However, increasing the value also slows the time it takes for the current pulse of transistor Q3 to be turned off, increasing commutation losses in transistor Q3, and increases the time for the regulator circuit to stabilize at startup.

As this current flows, the voltage across capacitor C6 increases. When the voltage across capacitor C6 plus the base to emitter voltage of transistor Q3 reaches the Zener voltage of diode D1, the current flowing through capacitor C6 ceases because the current is diverted to the Zener diode D1. Zener diode D1 provides the reference voltage to which the relay coil voltage will be regulated. When the current through capacitor C6 ceases, no current flows to the base of transistor Q3, turning it off and ending the pulse.

During the negative half of the line cycle, a current flows through resistor R8, diode D6, the collector and base of transistor Q3, and resistor R5. This current will turn transistor Q3 on. Also, during the negative half of the power line cycle, resistor R5 provides part of the current path through which capacitor C6 discharges into C5.

During the positive half of the line cycle at the end of the current pulse, resistor R5 causes transistor Q3 to more rapidly turn off, reducing energy losses during the commutation of transistor Q3. Resistor R5 will shunt some of the current that would otherwise go through the base of transistor Q3 during the pulse of transistor Q3 base current. If the current shunted is too much, the base current of transistor Q3 will not be enough to turn transistor Q3 completely on.

Capacitor C6 will now discharge into capacitor C5 until their voltages equalize. The voltage across capacitor C5 is equal to the average voltage across the relay coil K1. Diode D7 disconnects during the negative half of the power line cycle assuring that the relay current is direct current. As such, the discharge of capacitor C6 into capacitor C5 determines the pulse width for operation of the transistor Q3, which in turn allows current flow to establish the average mean voltage of relay coil K1.

The circuit shown in FIG. 1 also comprises a voltage averaging circuit, further comprising resistor R6, capacitor C5, and resistor R7. The averaging circuit essentially measures the average voltage across the relay coil K1. The average voltage across capacitor C5 is the voltage to which the circuit is regulated. The purpose of resistor R7, apart from forming part of the averaging circuit is also to ensure that diode D5 will not conduct during the positive half of the power line cycle. The current to resistor R8 flows through diode D6, turning it on, and then the current flows through the collector of transistor Q3, causing it to turn on. When transistor Q3 turns on, it creates a base current between the emitter of transistor Q3 and the negative end of capacitor C5. When the current begins flowing, diode D5 starts conducting, which causes capacitor C6 to discharge until at the same voltage as capacitor C5. The capacitors reach equal voltage at the average output voltage.

This feedback of the output voltage into the pulse forming circuit determines how long each cycle transistor Q3 will be turned on. (The feed back loop is as follows. Average voltage of relay coil K1 voltage-->voltage of capacitor C5-->voltage of capacitor C6-->duty cycle of transistor Q3 commutation-->average voltage of relay coil K1 voltage.) If the average voltage across the relay coil K1 is too low, the voltage across capacitor C6 will be less than the Zener voltage of diode D1 resulting in a longer On time of transistor Q3, which will cause the average relay coil voltage to increase. If the average voltage across the relay coil K1 is too high the voltage across capacitor C6 will approximate the Zener voltage of diode D1, resulting in a shorter On time of transistor Q3, which will cause the average relay coil voltage to decrease.

The circuit shown in FIG. 1 also comprises a plug J1, J2, J3. Plug J1, J2, J3 may be a twist lock Hubble type connector, used to connect a line voltage, neutral voltage, and load. The circuit also comprises a metal oxide variable resistor MOV1. MOV1 is not necessary for the operation of the circuit. It provides a level of protection, eliminating high voltage transients like might come from a lightning strike.

Devices, such as photocontrol circuits including power conversion circuits such as that illustrated in FIG. 1, generally are expected to have a lifetime corresponding to a lifetime of the street light/lamp that they are used to control. Such is desirable to allow the photocontrol circuit to be replaced at the same time as the lamp. Previously, the expected lifetimes for such lamps was about two to three years. However, modern lamps used in street lighting and the like may have a life expectancy of up to twenty years. However, the circuit of FIG. 1 generally uses aluminum electrolytic capacitors, particularly for capacitor C5, which typically limits the lifetime of the circuit to three years, the expected lifetime of the capacitors.

U.S. patent application Ser. No. 12/255,881 ("the '881 Application), which is hereby incorporated by reference herein as if set forth in its entirety herein, describes photocontrol circuits that may allow a decreased capacitance value for the capacitor C5 of FIG. 1 by changing the output stage design as will be further discussed later herein.

SUMMARY OF THE INVENTION

Embodiments of the present invention provide photosensor circuits including a relay coil configured to control application of an alternating current (AC) power source having a negative half and a positive half of a line cycle to a load. The photosensor circuits further include a pulse width modulator circuit configured to generate a pulse width modulated signal having a pulse width that varies responsive to an average voltage across the relay coil. The pulse width modulator includes a voltage averaging circuit including a capacitor coupled in parallel with the relay coil. A drive transistor is coupled between the relay coil and a neutral bus that controls the average voltage across the relay coil responsive to the pulse width modulated signal. A photo control circuit of the photosensor circuit is configured to control application of the pulse width modulated signal to the drive transistor responsive to a detected light level. A half-wave rectifier coupled to the power source is configured to provide a power signal to the pulse width modulator circuit and the photo control circuit during one of the halves of the line cycle of the AC power source. The photo control circuit includes a phototransistor that has a first terminal coupled to the power signal and a second terminal that outputs a current responsive to a level of light detected by the phototransistor. The photo control circuit further includes a low pass filter circuit coupled to the second terminal of the phototransistor that filters the output current of the phototransistor to provide a light level signal voltage and a select transistor that couples the pulse width modulated signal to the drive transistor during the one of the halves of the line cycle of the AC power source responsive to the light level signal voltage having a selected level. The pulse width modulator circuit further includes a current amplifier coupled between the voltage averaging circuit and the select transistor. The current amplifier may amplify a current discharged from the capacitor of the voltage averaging circuit to a base of the drive transistor during the negative half of the AC power source to reduce an amount of current discharged from the capacitor of the voltage circuit during the negative half of the AC power source.

In other embodiments, the pulse width modulator circuit further includes a duty cycle capacitor that discharges a current to the base of the drive transistor during the positive half of the AC power source. The current amplifier is coupled between the capacitor of the voltage averaging circuit and the duty cycle capacitor. The pulse width modulator circuit may further include a rectifying diode coupled between the voltage averaging circuit and the current amplifier. The rectifying diode may be coupled between a first terminal of the capacitor of the voltage averaging circuit and a base of the current amplifier and a second terminal of the capacitor of the voltage averaging circuit may be coupled to a collector of the drive transistor. The duty cycle capacitor may be coupled between a collector and an emitter of the current amplifier. The duty cycle capacitor may be a plurality of capacitors coupled in parallel.

In further embodiments, the pulse width modulator circuit further includes a second diode coupled between the base and the collector of the current amplifier.

In other embodiments, the pulse width modulator circuit further includes a capacitor coupled between the base and the collector of the current amplifier.

In yet other embodiments, the current amplifier is a PNP bipolar transistor. The capacitor coupled in parallel with the relay coil may be a ceramic capacitor.

In other embodiments, the photosensor circuit is a street lighting photo control device and the load comprises street lighting. The photosensor circuit may be configured to turn on the street lighting more rapidly than it turns off the street lighting.

In further embodiments, the lowpass filter circuit includes a delay resistor having a first terminal coupled to the first terminal of the photosensor and a delay capacitor coupled between a second terminal of the delay resistor and the neutral bus that are configured to provide the low pass filter circuit an asymmetric delay providing different turn off and turn on times for the load.

In yet other embodiments, a street lighting circuit includes a photosensor circuit including a relay coil configured to control application of an alternating current (AC) power source having a negative half and a positive half of a line cycle to a street light. A pulse width modulator circuit is configured to generate a pulse width modulated signal having a pulse width that varies responsive to an average voltage across the relay coil. The pulse width modulator includes a voltage averaging circuit including a ceramic capacitor coupled in parallel with the relay coil. A drive transistor is coupled between the relay coil and a neutral bus that controls the average voltage across the relay coil responsive to the pulse width modulated signal. A photo control circuit is configured to control application of the pulse width modulated signal to the drive transistor responsive to a detected light level. A half-wave rectifier is coupled to the power source that is configured to provide a power signal to the pulse width modulator circuit and the photo control circuit during one of the halves of the line cycle of the AC power source.

The photo control circuit includes a phototransistor. The phototransistor has a first terminal coupled to the power signal and a second terminal that outputs a current responsive to a level of light detected by the phototransistor. A low pass filter circuit coupled to the second terminal of the phototransistor filters the output current of the phototransistor to provide a light level signal voltage. A select transistor couples the pulse width modulated signal to the drive transistor during the one of the halves of the line cycle of the AC power source responsive to the light level signal voltage having a selected level. The pulse width modulator circuit further includes a bipolar current amplifier coupled between the voltage averaging circuit and the select transistor. The current amplifier amplifies a current discharged from the ceramic capacitor of the voltage averaging circuit to a base of the drive transistor during the negative half of the AC power source to reduce an amount of current discharged from the capacitor of the voltage circuit during the negative half of the AC power source. A rectifying diode is coupled between a first terminal of the capacitor of the voltage averaging circuit and a base of the current amplifier. A second terminal of the ceramic capacitor of the voltage averaging circuit is coupled to a collector of the drive transistor. The pulse width modulator circuit further includes a duty cycle capacitor coupled between a collector and an emitter of the current amplifier that discharges a current to the base of the drive transistor during the positive half of the AC power source. The current amplifier is coupled between the ceramic capacitor of the voltage averaging circuit and the duty cycle capacitor.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
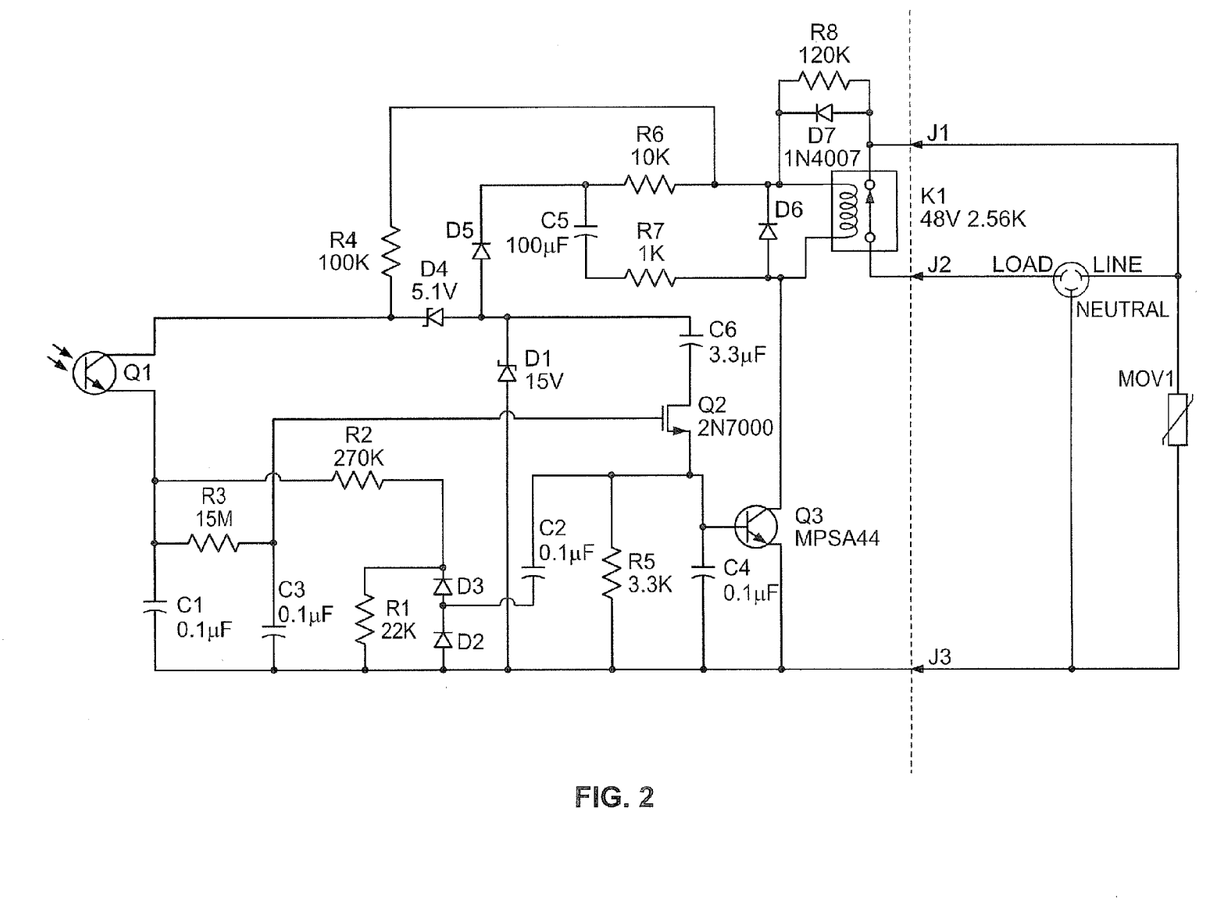
FIG. 2 is a circuit diagram of a photo-controlled power regulator according to the prior art.

As described in the '942 patent, the power regulator illustrated in FIG. 1 may be used in a lighting control system as shown in the circuit diagram of FIG. 2. The circuit shown in FIG. 2 causes a switch to close at dusk and open at dawn, such as for the control of streetlights. The power line voltage of the circuit shown can range from approximately 87 VAC to 305 VAC and have a power line frequency of 50 Hz or 60 Hz. This flexibility may allow the photo control to be usable in almost any alternating current application. To aid in stable operation, the control circuit operates as a Schmitt trigger, switching the output negative at a threshold voltage and not switching back until voltage drops to a lower threshold voltage.

The voltage at the relay coil K1 is converted from alternating current to direct current and regulated to provide for the correct operation of the relay K1. As noted above, because of the inductive nature of the relay coil K1, its voltage can have a large ripple component and it will still operate correctly. The regulated power supply circuit shown in FIG. 1 supplies this regulated direct current to the relay coil K1. In FIG. 2, transistor Q2 provides a switch to turn the regulated power supply circuit on or off in order to turn on or off the voltage to the relay coil K1 and hence turn a lamp or the like off or on. The maximum V drain to source will be equal to the Zener voltage of diode D1, 15 V. The maximum drain current is equal to the maximum current that flows through resistor R4.

The current of phototransistor Q1 increases with an increase of ambient light intensity and decreases with a decrease of ambient light intensity. The current from phototransistor Q1 passes through and causes a voltage across resistors R1 and R2. This voltage is proportional to the ambient light level and is referred to as the light signal. As phototransistor Q1's output is a current, the resistor R2, is used to transform current to voltage. R1 serves to convert the feedback current generated by the charge pump made up of D2, D3, and C2 into a voltage. By adjusting the resistance value of R1 the amount of feedback can be adjusted. This resistor could be called a hysteresis control. In most photo control circuits used in street lighting, it is desired that the turn off light level be twice the turn on light level. The value of R1 can be changed until this ratio of on to off light levels is achieved.

As the phototransistors may vary, R2 is usually adjusted to normalize the sensibility to the desired level. R2 may be called the "gain resistor".

Capacitor C1 filters the light signal, removing high frequency noise components that might be induced by lighting, radio interference, or other causes. If this circuit is shielded from external electromagnetic influences, such as radio interference or electromagnetic pulses as caused by lightning, C1 may not be necessary. The low pass filter or time delay circuit, comprising resistor R3 and capacitor C3, causes the light signal to be delayed approximately 1.5 seconds. The delay generally prevents short duration, transient light sources, such as a passing car headlights or a lighting flash causing the lamp to blink on and off. The output of the low pass filter is applied to the gate of phototransistor Q2, which is commuted on or off by the light signal, turning the regulated power supply circuit on or off in order to turn on or off the voltage to the relay coil K1 and hence turn the lamp off or on. A diode may be provided in parallel with resistor R3 to provide an asymmetric delay, allowing turn off and turn on times for street lighting or the like to differ.

The Zener diode D4 ensures that the phototransistor Q1 has a positive voltage across it. Although diode D4 is illustrated in FIG. 2, as is clear to one skilled in the art, it is not necessary. For example, diode D4 can be replaced with a short circuit, and the circuit should continue to function properly.

Capacitor C4 helps make the circuit resistant to radio interference, lightning discharges, and other interference. Like capacitor C1, if this circuit is shielded from external electromagnetic influences such as radio interference or electromagnetic pulses as caused by lightning, C4 may not be necessary.

Diodes D2 and D3 and capacitor C2 form a charge pump circuit. The charge pump circuit converts peak-to-peak alternating current voltage found across resistor R5 into a direct current of the needed polarity to produce positive feedback. The charge pump circuit provides positive feedback proportional to the relay current (output) to create a Schmitt trigger. The Schmitt trigger input to the phototransistor Q1 helps provide stability.

The transistor Q3 commutes the power to the relay, allowing the addition of only one transistor to the circuit to provide photo control. Positive voltage is derived from the low voltage end of resistor R4.

Further photosensor circuits are described in co-pending U.S. patent application Ser. No. 12/102,631 filed Apr. 21, 2008, entitled "Photosensor Circuits Including a Switch Mode Power Converter," the disclosure of which is incorporated by reference herein as if set forth in its entirety. FIG. 5 of U.S. patent application Ser. No. 12/102,631 illustrates a photosensor circuit in which the charge pump circuit of the circuit of FIG. 2 is not used for the positive feedback, allowing a reduction in the components of the circuit and a resultant cost savings, and in which a transistor, instead of a diode, is used to discharge the low pass filter capacitor of the circuit of FIG. 2 to provide different turn on and turn off times for the load.

Figure 3:
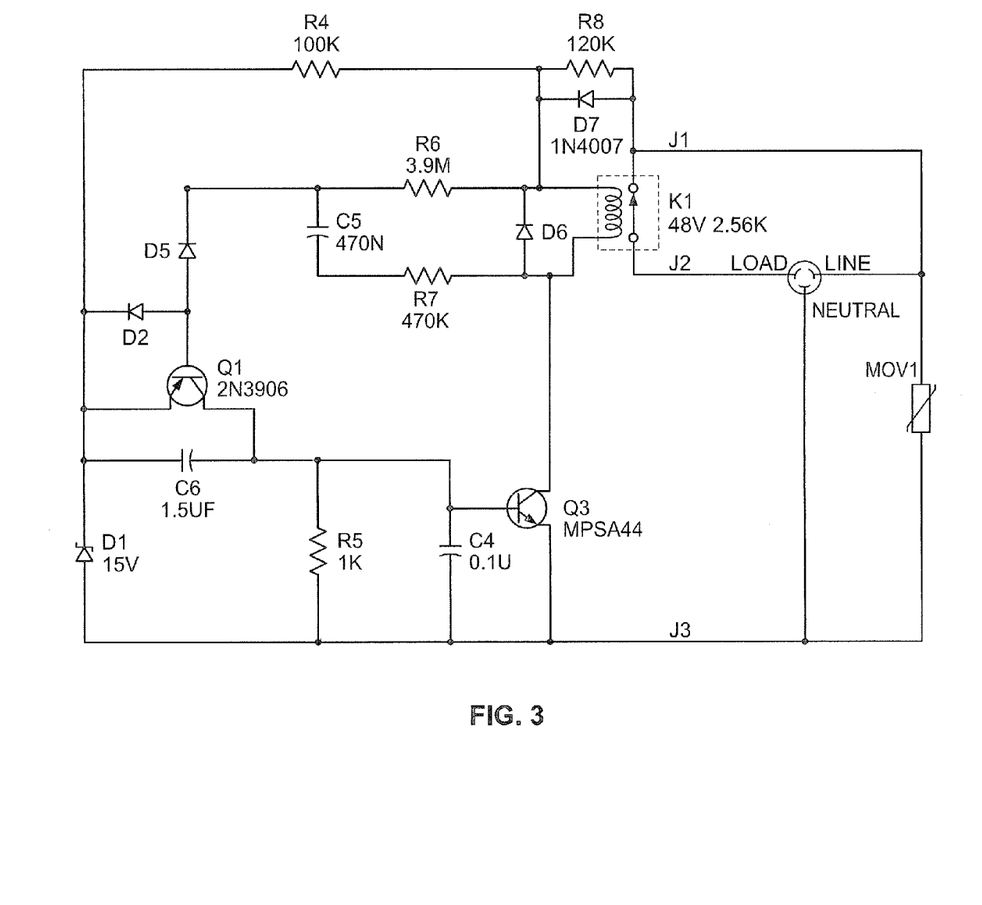
FIG. 3 is a circuit diagram of a power regulator according to some embodiments of the present invention.

A switch mode power converter according to some embodiments of the present invention is illustrated in FIG. 3. The circuit shown in FIG. 3, like that seen in FIG. 1, is a switch mode power regulator, which implements power line synchronized pulse width modulation (firing angle modulation). The circuit comprises a power circuit and a control circuit. The circuit of FIG. 3 includes a current amplifier Q1, shown as a PNP bipolar transistor, not found in the circuit of FIG. 1. As the practical diodes used as the diode D5 in FIG. 1 will generally conduct some current in the reverse direction, diode D2 is shown in the circuit of FIG. 3, which may protect the base of current amplifier Q1 in some embodiments. As the current drawn from the voltage averaging circuit including components R6, R7 and C5 of FIG. 3 will be reduced by the current gain B of the current amplifier transistor Q1, the resistance values of R6 and R7 can be increased B times and the capacitance value of C5 can be decreased B times without changing the time constant of the averaging circuit.

With this decrease in the capacitance value of capacitor C5 of the averaging circuit, which before was typically required to be an aluminum electrolytic type capacitor with a generally short life, the capacitor C5 can be a longer life ceramic type capacitor rather than an aluminum electrolytic type capacitor.

Figure 4:
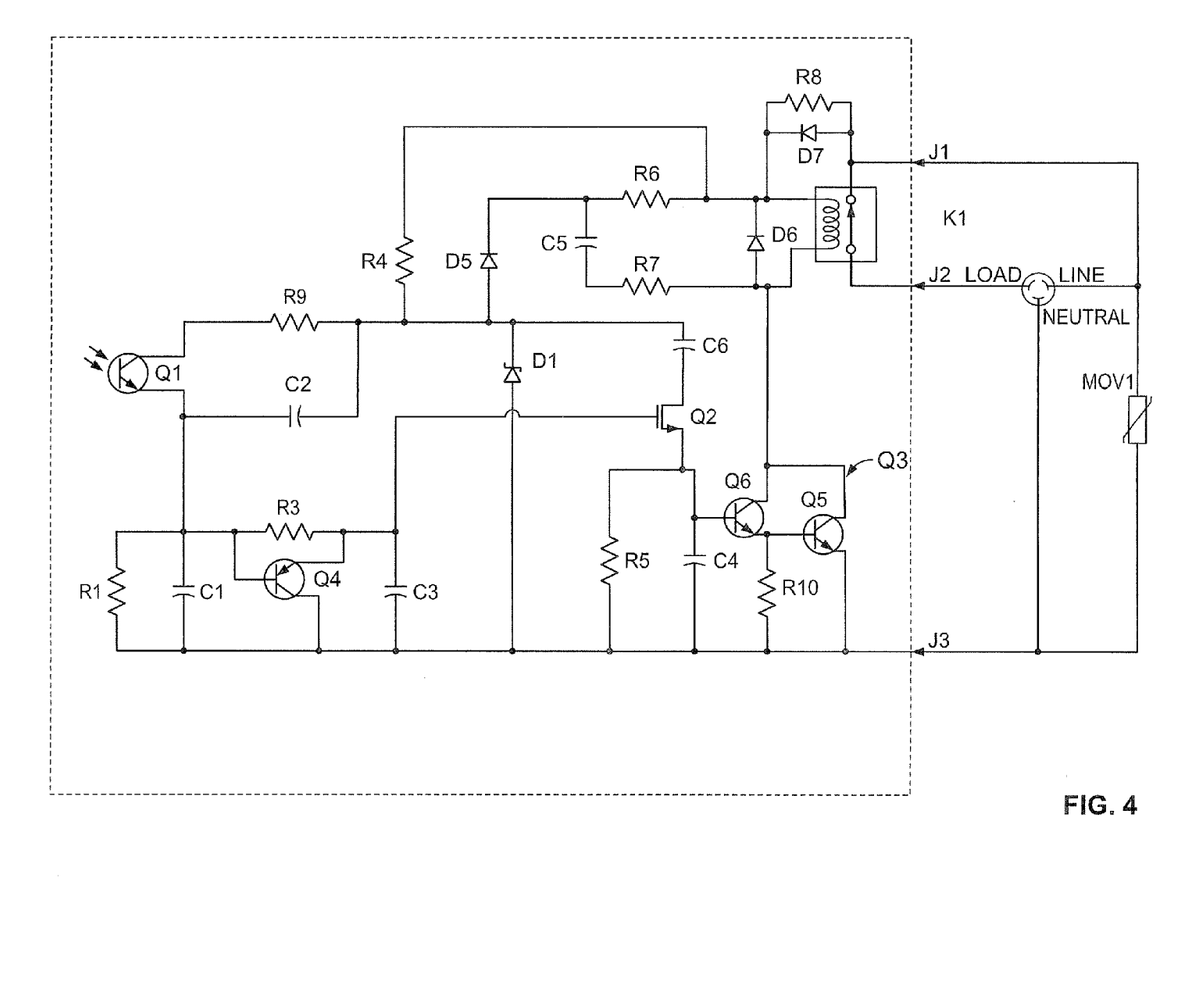
FIG. 4 is a circuit diagram of a photosensor circuit described in co-pending U.S. patent application Ser. No. 12/255,881, filed Oct. 22, 2008.

As discussed above, the '881 Application discloses circuits that also may allow for the use of longer life ceramic capacitors in the averaging circuit. An example photosensor circuit including a normally closed relay is shown in FIG. 4, which corresponds to FIG. 7 of the '881 Application. The circuit of FIG. 4 differs from that of FIG. 2 in that the single NPN transistor Q3 shown in FIG. 2 is replaced by a Darlington pair Q3 of NPN transistors Q5, Q6. As such, the circuit of FIG. 4 may increase the current gain of the circuit and decrease the amount of current required to commute the relay coil K1 current. Stated differently, the embodiments of FIG. 3 reduce the undesired current flow from capacitor C5 during the negative half of the line cycle by insertion of the current amplifier while the circuit of FIG. 4 reduces the current required to drive the base on the drive transistor Q3 (as it is a Darlington pair in FIG. 4), allowing a reduction in the capacitance value of C6, thus reducing the impact of C6 on current flow from C5 during the negative cycle, to allow use of a lower capacitance value for C5. However, the high gain of the Darlington pair Q3 and the small capacitance value of the capacitor C6 in FIG. 4 may make the circuit more susceptible to electromagnetic interference than embodiments of the present invention using a current amplifier as described with reference to FIG. 3.

Photosensor circuits including a switch mode power regulator including a current amplifier according to some embodiments of the present invention will now be described with reference to FIGS. 5-7. The embodiments of FIG. 5 are photosensor circuits not including an amplified phototransistor while the embodiments of FIGS. 6-7 include an amplified phototransistor.

As with the circuits described in co-pending U.S. patent application Ser. No. 12/102,631 filed Apr. 21, 2008, the circuits of FIGS. 5-7 do not including the charge pump circuit of the circuit of FIG. 2, including diodes D2 and D3 and capacitor C2. In the circuit of FIG. 2, the purpose of the charge pump circuit was to create the positive feed back necessary to create a Schmitt trigger response. In contrast, the circuit of FIGS. 5-7 obtain the desired positive feed back from an alternating current ripple which is conducted through phototransistor Q1.

Figure 5:
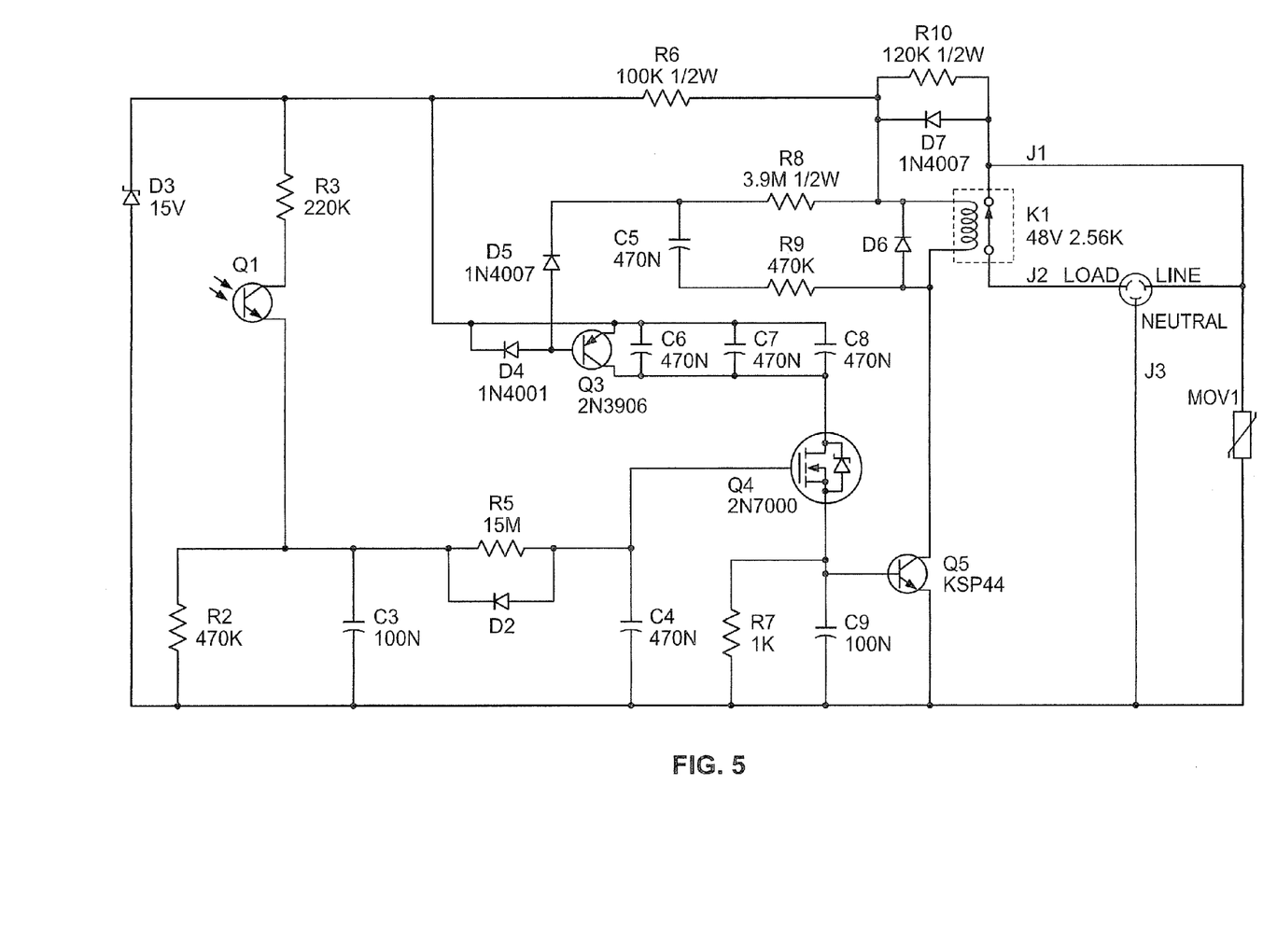
FIG. 5 is a circuit diagram of a photosensor circuit according to some embodiments of the present invention.
Figure 6:
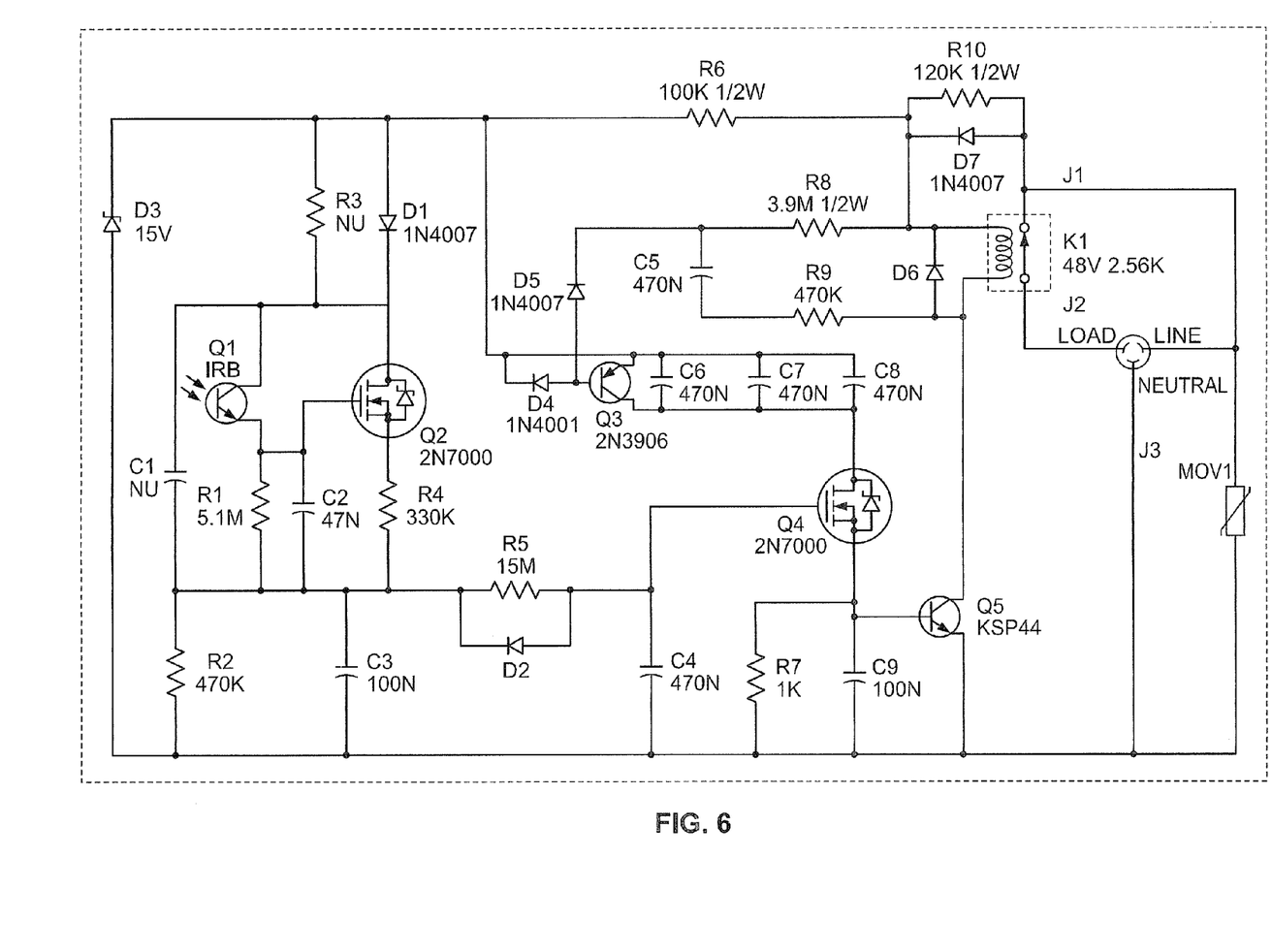
FIG. 6 is a circuit diagram of a photosensor circuit according to other embodiments of the present invention.
Figure 7:
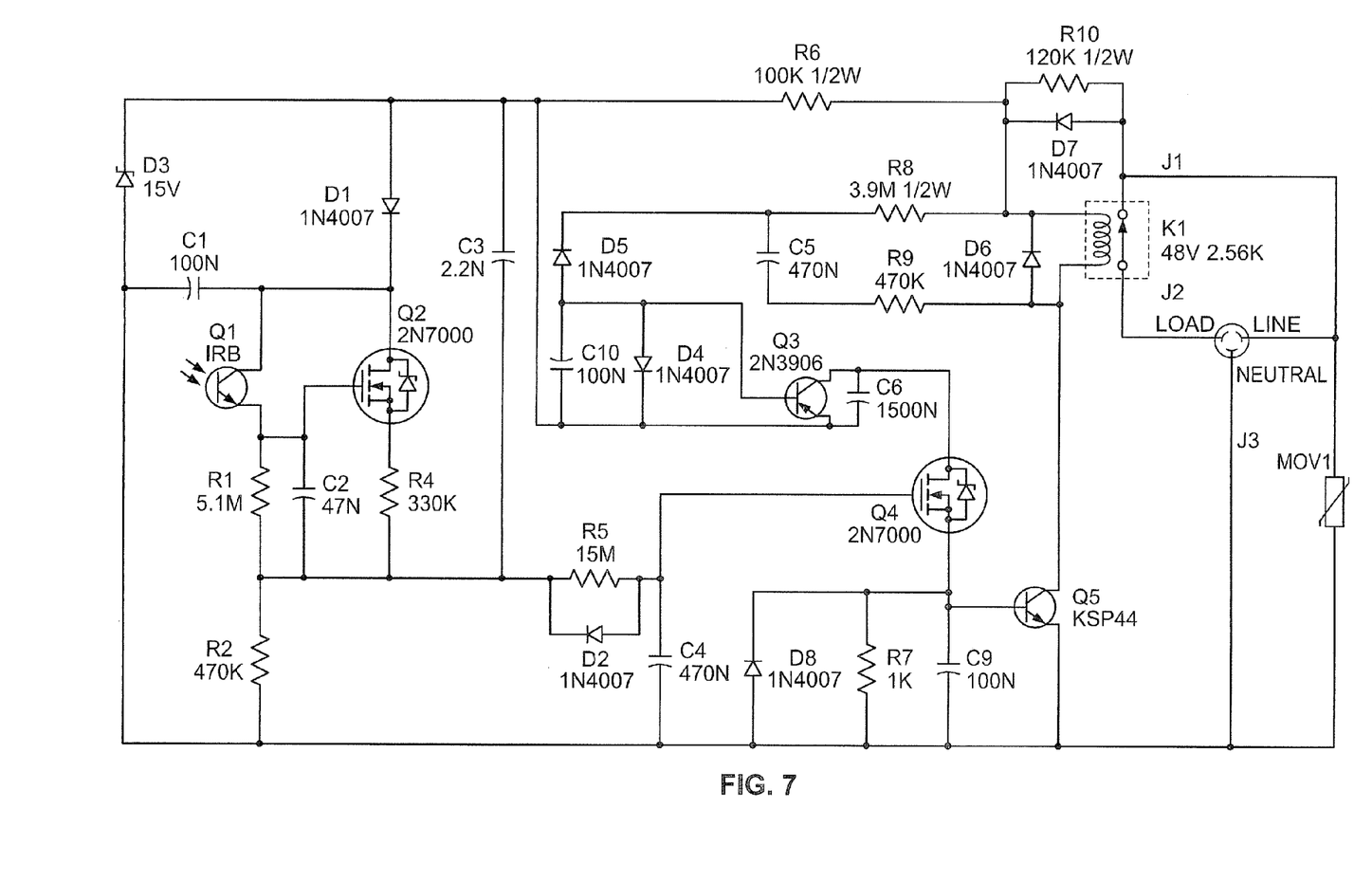
FIG. 7 is a circuit diagram of a photosensor circuit according to further embodiments of the present invention.

As seen in the circuits of FIG. 5-7, the illustrated photosensor circuits each include a normally closed relay coil K1. The relay coil K1 controls application of an alternating current (AC) power source LINE/J1, which carries both a negative half and a positive half of a line cycle, to a load LOAD/J2, such as a street light. A second reference polarity NEUTRAL/J3 is also provided. The illustrated relay coil K1 operates a normally closed switch so that the default state for the street lighting is turned on and application of a sufficient average voltage to the relay coil K1 turns off the street lighting in the illustrated circuit of FIGS. 5-7. However, it will be understood that some embodiments of the present invention may be configured with a normally open relay coil.

As discussed with reference to FIG. 1 above, a pulse width modulator circuit, including components C6, R6, R7, R8 and R9, generates a pulse width modulated signal having a pulse width that varies responsive to an average voltage across the relay coil K1. The pulse width modulator includes a voltage averaging circuit C5, R8, R9 including a capacitor C5 coupled in parallel with the relay coil K1.

A drive transistor Q5 coupled between the relay coil K1 and the neutral bus NEUTRAL/J3 controls the average voltage across the relay coil K1 responsive to the pulse width modulated signal input to the gate of the transistor Q5.

For the circuit illustrated in FIGS. 5-7, a photo control circuit is included that controls application of the pulse width modulated signal to the drive transistor Q5 responsive to a detected light level. A half-wave rectifier, including components D7 and R10, is coupled to the power source and provides a power signal to the pulse width modulator circuit and the photo control circuit during one of the halves of the line cycle of the AC power source LINE/J1.

As seen in the circuits of FIGS. 5-7, the photo control circuit includes the phototransistor Q1. The phototransistor Q1 has a first terminal coupled to the power signal and a second terminal that outputs a current responsive to a level of light detected by the phototransistor Q1. A low pass filter circuit R5, C4 is coupled to the second terminal of the phototransistor Q1 that filters the output current of the phototransistor Q1 to provide a light level voltage signal. The low pass filter circuit includes a delay resistor R5, which has a first terminal coupled to the second terminal of the photosensor Q1 and a delay capacitor C4 that is coupled between a second terminal of the delay resistor R5 and the neutral bus NEUTRAL/J3. The resistor R5, in combination with the capacitor C4, forms a timed delay circuit that may be used to limit or prevent the photo control from turning off/on during lightening flashes or other momentary light sources detected by the phototransistor Q1. In addition, for the embodiments of FIGS. 6-7, the signal from the phototransistor Q1 is amplified by the transistor Q2. They R5, C4 may be used to provide the low pass filter circuit an asymmetric delay providing different turn off and turn on times for the load in combination with the diode D2.

A select transistor Q4 couples the pulse width modulated signal to the base of the drive transistor Q5 during the rectified half of the line cycle of the AC power source LINE/J1 passed by the diode D7 responsive to the light level signal voltage having a selected level input to the gate of the transistor Q4. The alternating current feedback signal from the phototransistor Q1 is converted to a direct current signal by the diode D2.

In addition, as described with reference to FIG. 3, in the circuits of FIGS. 5-7, the pulse width modulation circuit further includes a current amplifier Q3 coupled between the voltage averaging circuit C5, R8, R9 and the select transistor Q4. The current amplifier Q3 amplifies a current discharged from the capacitor C5 of the voltage averaging circuit to a base of the drive transistor Q5 during the negative half of the AC power source to reduce an amount of current discharged from the capacitor C5 of the voltage circuit during the negative half of the AC power source.

The pulse width modulator circuits of FIGS. 5-7 further include a duty cycle capacitor C6 that discharges a current to the base of the drive transistor Q5 during the positive half of the AC power source. The current amplifier Q3 is coupled between the capacitor C5 of the voltage averaging circuit and the duty cycle capacitor C6. More particularly, the duty cycle capacitor C6 is coupled between a collector and an emitter of the current amplifier Q3. As seen in the embodiments of FIGS. 5 and 6, the duty cycle capacitor C6 is provided as a plurality of capacitors C6, C7, C8 coupled in parallel. Such an arrangement provides for use of smaller capacitors, shown as 470 nanofarad capacitors in FIGS. 5-6 as contrasted with a single 1500 nanofarad capacitor in FIG. 7

The pulse width modulator circuits of FIGS. 5-7 further include a rectifying diode D5 coupled between the voltage averaging circuit and the current amplifier Q3. The rectifying diode D5 is coupled between a first terminal of the capacitor C5 of the voltage averaging circuit and a base of the current amplifier Q3. A second terminal of the capacitor C5 of the voltage averaging circuit is coupled to a collector of the drive transistor Q5 through the resistor R9.

The pulse width modulator circuits of FIGS. 5-7 also include a second diode D4 coupled between the base and the collector of the current amplifier Q3. Diode D4 is provided to protect current amplifier Q3 from being damaged by an emitter to base voltage breakdown caused by the reverse leakage of diode D5. The embodiments of FIG. 7 further include a capacitor C10 coupled between the base and the collector of the current amplifier Q3. Capacitor C10 is provided to limit or even prevent electrical noise, such as that caused by radio interference, from affecting the operation of the photosensor circuit.

In some embodiments, the current amplifier Q3 is a PNP bipolar transistor. In other embodiments, the capacitor C5 coupled in parallel with the relay coil K1 is a long life ceramic capacitor. The duty cycle capacitor C6 may also be a long life ceramic capacitor. As a result, the embodiments of FIGS. 5-7 may provide a long life, efficient, high-load capacity and inexpensive photo control.

The photosensor circuit seen in FIGS. 5-7 may be a street lighting photo control device and the load may be street lighting. The photosensor circuit may be configured to turn on the street lighting more rapidly than it turns off the street lighting.

As discussed above, as the technology of street lighting advances, more efficient and longer life lamps are being introduced. While previously a typical street lamp generally lasted three years before replacement was necessary, new street lamps last as long as 20 years. Accordingly, a photocontrol that can be guaranteed for a 20-year life may also be desirable. Such an extended life may be provided by embodiments as illustrated in FIGS. 5-7.

In contrast, typical conventionally available photocontrols contain aluminum electrolytic capacitors. Such aluminum electrolytic capacitors are generally rated at a lifetime of 5,000 hours (208 days). This also generally limits the lifetime of any photocontrol utilizing aluminum electrolytic capacitors to less than 5,000 hours (208 days). By operating the aluminum electrolytic capacitors at much lower voltages and temperatures than their maximum ratings, their lives and that of the photocontrols utilizing them can be extended up to three years but not the desired 20 years. By allowing practical use of long-life capacitors, such as ceramic-type capacitors, circuit life can be significantly increased as ceramic capacitors typically last extreme lengths of time. Furthermore, as new LED-type lamps tend to be lower in power, the power dissipation component of the photocontrol circuit itself becomes a greater percentage of the total efficiency equation for the lighting. As such, reductions of energy consumption of the photocontrol circuit are also beneficial.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A photosensor circuit, comprising:
a relay coil configured to control application of an alternating current (AC) power source having a negative half and a positive half of a line cycle to a load;
a pulse width modulator circuit configured to generate a pulse width modulated signal having a pulse width that varies responsive to an average voltage across the relay coil, the pulse width modulator including a voltage averaging circuit including a capacitor coupled in parallel with the relay coil;
a drive transistor coupled between the relay coil and a neutral bus that controls the average voltage across the relay coil responsive to the pulse width modulated signal;
a photo control circuit configured to control application of the pulse width modulated signal to the drive transistor responsive to a detected light level; and
a half-wave rectifier coupled to the power source that is configured to provide a power signal to the pulse width modulator circuit and the photo control circuit during one of the halves of the line cycle of the AC power source;
wherein the photo control circuit comprises:
a phototransistor that detects the detected light level, the phototransistor having a first terminal coupled to the power signal and a second terminal that outputs a current responsive to the detected light level;
a low pass filter circuit coupled to the second terminal of the phototransistor that filters the output current of the phototransistor to provide a light level signal voltage; and
a select transistor that couples the pulse width modulated signal to the drive transistor during the one of the halves of the line cycle of the AC power source responsive to the light level signal voltage having a selected level, and wherein the pulse width modulator circuit further comprises a current amplifier coupled between the voltage averaging circuit and the select transistor.

2. The photosensor circuit of claim 1, wherein the current amplifier amplifies a current discharged from the capacitor of the voltage averaging circuit to a base of the drive transistor during the negative half of the AC power source to reduce an amount of current discharged from the capacitor of the voltage circuit during the negative half of the AC power source.

3. The photosensor circuit of claim 2, wherein the pulse width modulator circuit further includes a duty cycle capacitor that discharges a current to the base of the drive transistor during the positive half of the AC power source and wherein the current amplifier is coupled between the capacitor of the voltage averaging circuit and the duty cycle capacitor.

4. The photosensor circuit of claim 3, wherein the photosensor circuit comprises a street lighting photo control device and the load comprises street lighting.

5. The photosensor of claim 4, wherein the photosensor circuit is configured to turn on the street lighting more rapidly than it turns off the street lighting.

6. The photosensor circuit of claim 3, wherein the pulse width modulator circuit further includes a rectifying diode coupled between the voltage averaging circuit and the current amplifier.

7. The photosensor circuit of claim 6, wherein the rectifying diode is coupled between a first terminal of the capacitor of the voltage averaging circuit and a base of the current amplifier and wherein a second terminal of the capacitor of the voltage averaging circuit is coupled to a collector of the drive transistor.

8. The photosensor circuit of claim 7, wherein the duty cycle capacitor is coupled between a collector and an emitter of the current amplifier.

9. The photosensor circuit of claim 8, wherein the duty cycle capacitor comprises a plurality of capacitors coupled in parallel.

10. The photosensor circuit of claim 8, wherein the pulse width modulator circuit further includes a second diode coupled between the base and the collector of the current amplifier.

11. The photosensor circuit of claim 10, wherein the pulse width modulator circuit further includes a capacitor coupled between the base and the collector of the current amplifier.

12. The photosensor circuit of claim 1, wherein the current amplifier comprises a PNP bipolar transistor.

13. The photosensor circuit of claim 1, wherein the capacitor coupled in parallel with the relay coil comprises a ceramic capacitor.

14. The photosensor circuit of claim 1, wherein the photosensor circuit comprises a street lighting photo control device and the load comprises street lighting.

15. The photosensor of claim 14, wherein the photosensor circuit is configured to turn on the street lighting more rapidly than it turns off the street lighting.

16. The photosensor circuit of claim 1, wherein the lowpass filter circuit comprises a delay resistor having a first terminal coupled to the first terminal of the photosensor and a delay capacitor coupled between a second terminal of the delay resistor and the neutral bus that are configured to provide the low pass filter circuit an asymmetric delay providing different turn off and turn on times for the load.

17. A street lighting circuit including a photosensor circuit, comprising:
a relay coil configured to control application of an alternating current (AC) power source having a negative half and a positive half of a line cycle to a street light;
a pulse width modulator circuit configured to generate a pulse width modulated signal having a pulse width that varies responsive to an average voltage across the relay coil, the pulse width modulator including a voltage averaging circuit including a ceramic capacitor coupled in parallel with the relay coil;
a drive transistor coupled between the relay coil and a neutral bus that controls the average voltage across the relay coil responsive to the pulse width modulated signal;
a photo control circuit configured to control application of the pulse width modulated signal to the drive transistor responsive to a detected light level; and
a half-wave rectifier coupled to the power source that is configured to provide a power signal to the pulse width modulator circuit and the photo control circuit during one of the halves of the line cycle of the AC power source;
wherein the photo control circuit comprises:
a phototransistor that detects the detected light level, the phototransistor having a first terminal coupled to the power signal and a second terminal that outputs a current responsive to the detected light level;
a low pass filter circuit coupled to the second terminal of the phototransistor that filters the output current of the phototransistor to provide a light level signal voltage; and
a select transistor that couples the pulse width modulated signal to the drive transistor during the one of the halves of the line cycle of the AC power source responsive to the light level signal voltage having a selected level, and
wherein the pulse width modulator circuit further comprises a bipolar current amplifier coupled between the voltage averaging circuit and the select transistor, wherein the current amplifier amplifies a current discharged from the ceramic capacitor of the voltage averaging circuit to a base of the drive transistor during the negative half of the AC power source to reduce an amount of current discharged from the capacitor of the voltage circuit during the negative half of the AC power source and wherein a rectifying diode is coupled between a first terminal of the capacitor of the voltage averaging circuit and a base of the current amplifier and wherein a second terminal of the ceramic capacitor of the voltage averaging circuit is coupled to a collector of the drive transistor and wherein the pulse width modulator circuit further includes a duty cycle capacitor coupled between a collector and an emitter of the current amplifier that discharges a current to the base of the drive transistor during the positive half of the AC power source and wherein the current amplifier is coupled between the ceramic capacitor of the voltage averaging circuit and the duty cycle capacitor.

* * * * *